(No Model.)
C. C. CHESNEY & J. F. KELLY.
SYSTEM OF ELECTRICAL DISTRIBUTION.
No. 571,300. Patented Nov. 10, 1896.
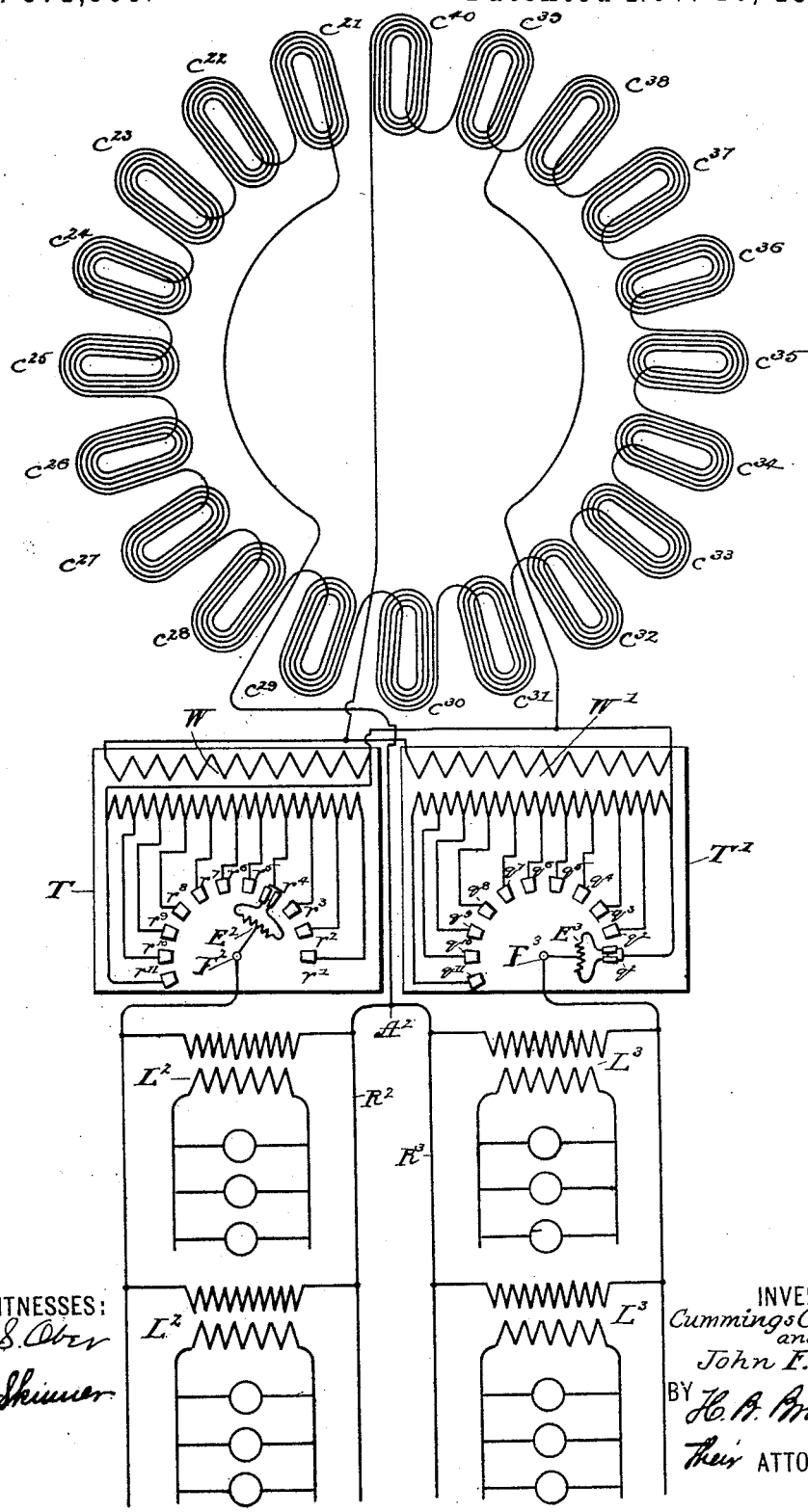
WITNESSES:
Frank S. Ober
R. M. Skinner
INVENTORS:
Cummings C. Chesney
and
John F. Kelly.
BY H. A. Brownell
Their ATTORNEY

UNITED STATES PATENT OFFICE.

CUMMINGS C. CHESNEY AND JOHN F. KELLY, OF PITTSFIELD, MASSACHUSETTS, ASSIGNORS TO THE STANLEY ELECTRIC MANUFACTURING COMPANY, OF SAME PLACE.

SYSTEM OF ELECTRICAL DISTRIBUTION.

SPECIFICATION forming part of Letters Patent No. 571,300, dated November 10, 1896.

Application filed December 3, 1895. Serial No. 570,892. (No model.)

*To all whom it may concern:*

Be it known that we, CUMMINGS C. CHESNEY and JOHN F. KELLY, citizens of the United States, residing at Pittsfield, county of Berkshire, and State of Massachusetts, have invented certain new and useful Improvements in Systems of Electrical Distribution, of which the following is a specification.

The object of our invention is to provide a system in which the electromotive force of the current in its various parts can be varied so as to make up for line losses and the like without affecting the generating-dynamo or the system as a whole.

The following is a description of a system embodying our invention, reference being had to the accompanying drawing, which represents, diagrammatically, a system embodying the invention.

In the system as shown in the drawing there are two or more branch or distributing circuits supplied by an alternating-current dynamo having a set of principal generating-coils and also one or more independent auxiliary generating-coils of like or opposite phase to that of their principal coils. Each branch circuit has a current-controller. The controllers each consist of a transformer having the ordinary primary and secondary coils and any of the well-known means for varying its secondary electromotive force. In the system shown in the drawing this means is a switchboard having its contacts connected with the secondary transformer-coil at several points. The controller thus made up has its primary transformer-coil in series with the independent auxiliary coils of the generator, and through its secondary, when in action, adds the energy of the current induced in the independent auxiliary coils to that of the principal generating-coils.

The above is a general statement of a form in which our invention may be embodied.

To be more specific, $C^{21}$ to $C^{40}$ represent the coils of an alternating-current dynamo. The dynamo, preferably, should be one in which the induced coils are stationary. Part of these coils $C^{21}$ to $C^{38}$, inclusive, are connected in series with three or more terminals, one of which is connected to the junction $A^2$ of the several return-wires $R^2 R^3$ of the branch or distributing circuits, while the other is connected to contacts $q'$ and $r^{11}$ on the controllers T T' for controlling the output of the independent auxiliary coils. The branch circuits contain translating devices (shown in the present case as lamps) supplied by ordinary transformers $L^2 L^3$. The remaining coils, $C^{39}$ and $C^{40}$, are the independent auxiliary coils, which are of like or opposite phase to that of their principal coils $C^{21}$ to $C^{38}$.

T T' are the current-controllers or controlling transformers, consisting, as shown, respectively of transformers W W' and some well-known means for regulating their output. These means are here shown as switchboards having their contacts $q'$ to $q^{11}$ and $r'$ to $r^{11}$, inclusive, connected at various points to the secondary transformer-coils and their arms $E^2 E^3$ connected to the outgoing ends of their respective branch circuits, as at $F^2 F^3$. The primary transformer-coil of each of these controllers is in series with the independent auxiliary generating-coils $C^{39} C^{40}$, and its secondary when in action is in series with the principal generating-coils and the line and adds the energy of the current induced in the independent auxiliary coils to that of the principal coils. It will be seen that in this arrangement, by varying the secondary electromotive force of a transformer forming part of the current-controller, the electromotive force of any of the branch circuits can be varied at will by the action of the independent auxiliary coils, and that, too, without in any way affecting the principal generating-coils or the machine as a whole.

In the system shown in the drawing the controller on the right, T', is such as to permit the electromotive force of its line to be raised, while the controller on the left, T, in which the connections of the transformer and switchboard are similar to those of T', except that the conductor from the principal coils connects with the other end of the secondary of the transformer, operates to reduce the electromotive force of the line.

From the above description the method of operation is obvious.

We have, for the sake of simplicity, described our invention as embodied in a single-phase system. It is even more valuable and important when embodied in systems for polyphase currents, since, in the case of a variation of the electromotive force of the line of one of the several circuits of a polyphase system due to change in load, a corresponding variation in the armature-coils is involved, and with all polyphase circuits affected by the same field any attempt to counteract a change in the electromotive force of the line by acting on the field strength must act equally on all the circuits, whether they be lightly loaded or heavily loaded.

In a system where a polyphase generator is used our invention can be advantageously embodied, especially in small installations, by having one controller for each of the several main or distributing circuits carrying the currents of different phase, in which case the circuits controlled by a single field can be independently controlled, so as to counteract any change in the electromotive force of either circuit—a thing which, as above stated, cannot be done by acting on the strength of the common field.

In our system any form of alternating generator can be used. It is clear, however, that machines with stationary armature-windings are best for such systems, as by the use of such a system there is no multiplicity of moving contacts.

Having thus described our invention, what we claim is—

1. A system of electrical distribution consisting of a work-circuit containing translating devices, a dynamo having principal generating-coils and independent auxiliary generating-coils, and a circuit-controller consisting of a controlling transformer energized by the current from said independent auxiliary coils and supplying an electromotive force in series with or opposition to that of the main work-circuit, substantially as described.

2. A system of electrical distribution consisting of more than one circuit, a dynamo having principal generating-coils and independent auxiliary generating-coils, and independent circuit-controllers, each consisting of a controlling transformer energized by the current from said independent auxiliary generating-coils, and supplying an electromotive force in series with or opposition to that of the principal generating-coils and the line, substantially as described.

3. A system of electrical distribution consisting of more than one circuit, a dynamo having principal generating-coils and independent auxiliary generating-coils, and independent circuit-controllers, each consisting of a controlling transformer having its primary in series with the independent auxiliary generating-coils, and its secondary when in action in series with or opposition to the principal generating-coils and the line, substantially as described.

In witness whereof we have hereunto set our hands this 29th day of November, 1895.

CUMMINGS C. CHESNEY.
JOHN F. KELLY.

Witnesses:
WM. B. JACKSON,
A. C. CLARK.